July 13, 1937.                G. DE BEESON                2,087,086
                              MAGNETIC COMPASS
                           Filed Dec. 24, 1935            2 Sheets-Sheet 1

INVENTOR.
GEORGE DE BEESON.
BY Lippincott & Metcalf
ATTORNEYS.

July 13, 1937.
G. DE BEESON
2,087,086
MAGNETIC COMPASS
Filed Dec. 24, 1935
2 Sheets-Sheet 2
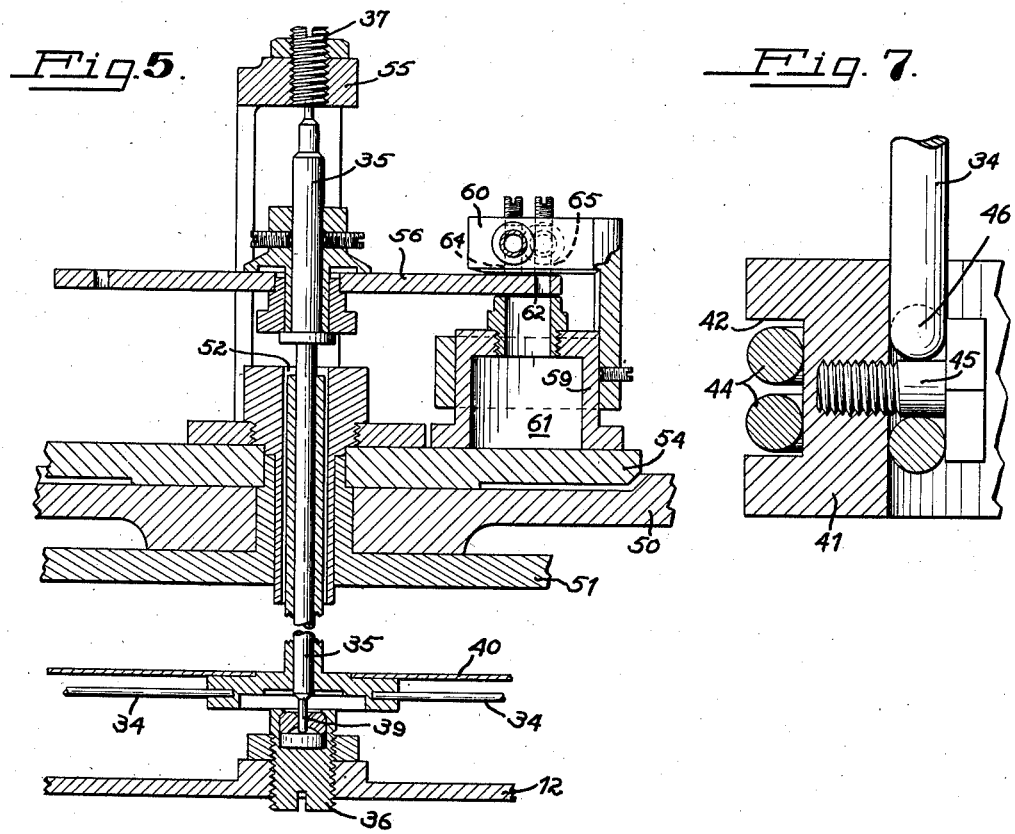
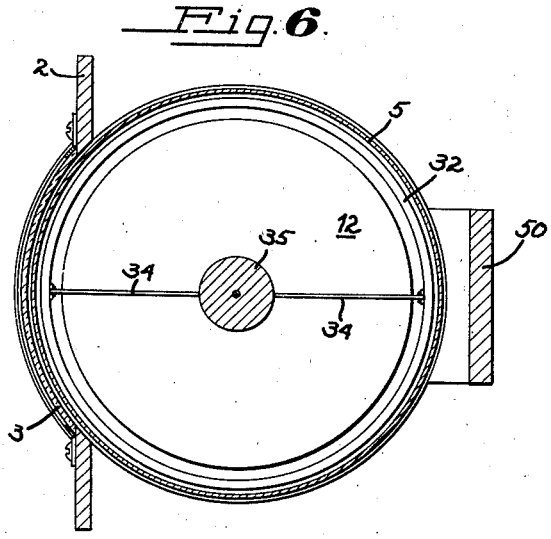
INVENTOR.
GEORGE DE BEESON.
BY
Lippincott & Metcalf
ATTORNEYS.

Patented July 13, 1937

2,087,086

UNITED STATES PATENT OFFICE 2,087,086

MAGNETIC COMPASS

George De Beeson, San Francisco, Calif., assignor to R. Stanley Dollar, San Francisco, Calif.

Application December 24, 1935, Serial No. 56,019

7 Claims. (Cl. 33—222)

My invention relates to magnetic compasses, and more particularly to a compass which can be utilized to operate a valve.

This application is a continuation in part of my application, Serial No. 39,761, filed September 9, 1935, for an Automatic pilot, and the compass herein described and claimed is an improvement on the compass described in my prior application, although performing the same duty in the automatic pilot system and operating in the same broad manner.

Among the objects of my invention are: To provide an improved type of magnetic compass so constructed and arranged as to directionally control an automatic pilot; to provide a magnetic compass of extreme accuracy and reliability; to provide a magnetic compass capable of operating a valve; to provide such a compass wherein the valve controlled thereby may be used to operate an automatic pilot; to provide a magnetic compass and valve assembly; to provide a means and method of driving a valve by a magnetic unit; to provide a compass having a minimum tendency to swing; to provide a compass having a member oriented by the earth's magnetism, this member in turn controlling magnetically an intermediate member, which in turn operates a valve; to provide such an assembly wherein there is minimum hunting between the magnetic member and the driven member; to provide a compass having a minimum tendency to oscillate in any plane; and to provide a simple control mechanism for an automatic pilot.

In my prior application I have described an automatic pilot wherein the rudder controls of a moving craft, preferably aircraft, may be operated by a magnetic compass so that a definite course over the earth's surface can be followed.

Broadly, the prior application described a magnetic compass having a permanently magnetic member free to take its proper position in the earth's field and thus act as a compass. This permanently magnetic member in turn operated a follower, which in turn operated an air valve in such a manner that when the predetermined desired course coincided with the setting of air valve ports or the port indicia, power applied to a pair of opposed rudder motors would be equal. When the compass changed its position relative to the aircraft due to a turning movement thereof, the valve driven by the driven member moved with the compass to unbalance the power to the opposed rudder motors, thus causing the rudder surfaces to return the ship toward the proper course.

The preferred power utilized in my prior apparatus was air at a negative pressure, and the present invention is an improved compass peculiarly adapted to cooperate with an entire automatic pilot system in the same manner, and under the same circumstances, as the compass described in the application referred to, although it is useful for many other purposes as well.

While the magnetic compass has been known and used for many years, certain inherent disadvantages have long been known to exist, and their use, particularly in aircraft where sudden yaws and rapid turning movements are often encountered, has not been satisfactory in all respects. There is a tendency for the directional unit of the compass to spin, and if such spinning should occur, it may be that a considerable length of time will elapse before the spinning is stopped and the compass quieted to a point where a true directional indication may be obtained. It is therefore of paramount importance that an aircraft compass in particular, and all compasses in general, be as free as possible from this spinning tendency. Furthermore, when a compass is used with a separate driven member coupled thereto magnetically, there is a tendency, when the poles of the driver and the driven member become separated, for hunting to occur in the interval necessary for coincidence of the poles again; and the construction herein described and claimed, to a large extent, eliminates such hunting.

Furthermore, when a driver and driven member are used the factor of dip is present, and this factor has also been taken into account in the design of the improved compass herein described.

Broadly, in terms of apparatus, my invention comprises a circular permanently magnetized member having poles lying in a diameter thereof. A spaced driven member, also of magnetic material, is provided, preferably lying in the same plane and free, to a limited extent, to maintain itself in the same plane as the permanently magnetized member. The driven member is attached to an axle which in turn drives a disc, or other type of valve, wherein the two diametrically opposed points only give a uniform response in two power lines, all points on one side of the diameter giving a full response in one power line, and all points on the other side of the diameter giving a full response in the other power line.

In broad terms of method, my invention comprises magnetically driving a valve member controlling power, by the orienting motion of a circular permanent magnet, and so arranging the application of the magnetic coupling in the drive that oscillation in any plane is reduced to a minimum.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Other broad aspects of my invention may be more readily understood by direct reference to a preferred embodiment of my invention as shown in the drawings, in which:

Figure 5 is an enlarged sectional view of the valve assembly, taken as indicated by the line 5—5 in Figure 4.

Figure 6 is a cross sectional view, taken as indicated by the line 6—6 in Figure 2.

Figure 7 is an enlarged view, mostly in section, of a driven member.

Figure 1:
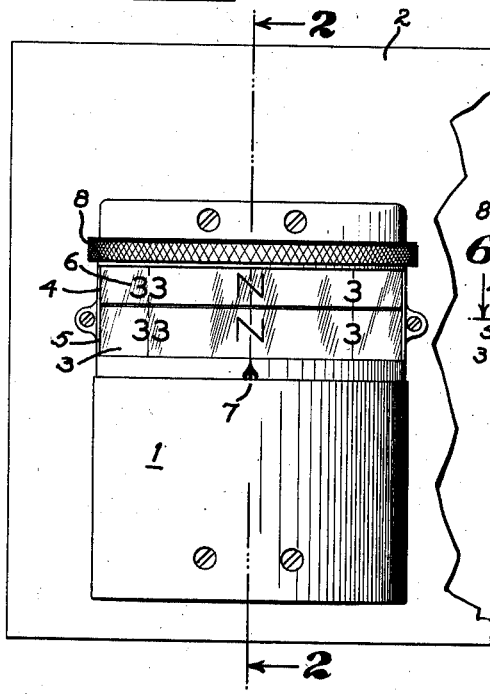
Figure 1 is a front face view in elevation of one form of my invention.

Referring to the drawings, a compass case 1 is preferably so mounted as to project somewhat from an instrument panel 2, and is provided with a transparent window 3 through which a pair of 360° compass cards may be viewed, a course card 4 and a compass card 5, these cards being marked with indicia 6 representing direction and degrees of direction.

Also visible on the front of the case 1 is a longitudinal craft axis mark 7. A knurled edge 8 also projects from the panel 2 immediately above the course card 4, and is attached thereto for the purpose of moving the course card relative to axis mark 7 or the compass card 5.

Referring next to the sectional views illustrating the inner mechanism of my compass, a compass container 10 is mounted on base bracket 11, and a compass cover 12 is fitted to the base 10 and held in place by screws 14, thus defining a compass chamber 15. I prefer that the joint between cover 12 and base 10 be tight in order that the compass chamber as a whole may be filled with liquid.

Compass base 10 is provided with a central upright pillar 16, the base of which is perforated with apertures 17 leading through drill hole 18 into an expansion chamber 19. This expansion chamber is provided with a filler plug 20 whereby the entire chamber 15 may be filled with a damping fluid, such as alcohol, the expansion and contraction of the liquid being accommodated by the expansion chamber 19. Central pillar 16 carries a compass bearing 21 mounted on a spring 22 and maintained in place by retaining nut 24 having a coned opening 25 leading to the bearing 21.

Mounted on the bearing 21 is a compass pivot 26 carrying a domed compass disc 27, the dome 28 being so arranged that a pair of permanently magnetized compass needles 29 lie substantially in the plane of the bearing 21. The disc 27 is preferably of light material, such as aluminum, and the compass needles 29, each semi-circular, are riveted to the edge thereof in such a manner that their north poles 30 abut, as do their south poles 31. Thus, the entire magnetic unit forms a complete circle with sharply defined poles.

Figure 3:
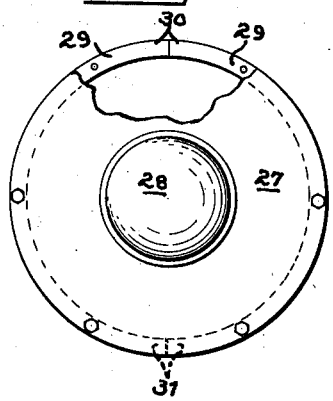
Figure 3 is a top plan view, partly cut away, of the permanently magnetized member and mount.

In assembling the permanently magnetized driving assembly as shown in Figure 3, comprising disc 27 and compass needles 29, I prefer to statically and dynamically balance the entire assembly before magnetization of the steel, so that were it not for the magnetism, the compass needle assembly would act as a perfect fly wheel and maintain itself in all positions. After it is magnetized, however, and mounted on an axial bearing it will, if unhindered by other forces, seek the dip angle known to exist in the particular locality where used, the coned opening 25 allowing for tilt of pivot 26.

Mounted outside the cover 12 but immediately surrounding it is a circular driven member 32 supported on a spider 34 which rises over the top of the compass cover 12, and is rigidly attached to a driven axle 35 which lies in an extension of the axis of the compass assembly when the latter is parallel to the earth's surface. This axle 35 is mounted below on bearing 36, and above on bearing 37, the pivots in this case being at least below, preferably mounted in jewels 39, in order that the axle may turn as freely as possible. This axle also carries, firmly attached thereto, a compass card disc 40 to the periphery of which is attached course card 5, previously described.

Driven member 32 is shown more in detail in Figure 7. Driven member 32 is a complete ring 41 of non-magnetic material having an exterior circumferential groove 42 in which are positioned several rings of hard steel wires 44, and I have found that piano wire is satisfactory for this purpose. Spider 34 is attached to ring 41 at two points only, these points being diametrically opposite and determined by a bearing screw 45 around which the wire of the spider 34 forms a bend 46, thus allowing the ring 41 to tilt freely on the axis thus defined; and I prefer then to so magnetize the steel wires 44 that the north and south line of the magnet formed will be in the line of the axis defined by bearings 45. Thus, the ring 41 may rotate only on one axis, and this axis as regards the magnetization of the driven member, is the north and south axis.

Compass bracket 11 carries a valve bracket 50 extending from the rear thereof up and around the compass assembly in general, and extending forward again to join front panel 2; and mounted to be rotated thereon and coaxial with axle 35 is a course disc 51 carrying near the periphery thereof course card 4, and having extending outwardly beyond the course card, knurled edge 8, previously described.

Course disc 51 is provided with a central boss 52 which is apertured to allow passage of axle 35 without frictional contact therewith, and also to make connection with valve plate 54, which will rotate as disc 51 is rotated, the valve plate 54 and disc 51 forming upper and lower retaining members to finish the bearing in bracket 50.

Valve plate 54 carries a bearing bracket 55 surrounding a valve disc 56 attached to the upper end of axle 35, and bracket 55 also carries upper axle bearing 37, previously described; so that as described, without taking into account magnetic moments involved, compass disc 27 lies substantially in the same plane as driven member 32; and compass car disc 51, valve plate 54 and valve disc 56 all lie in parallel planes.

Figure 4:
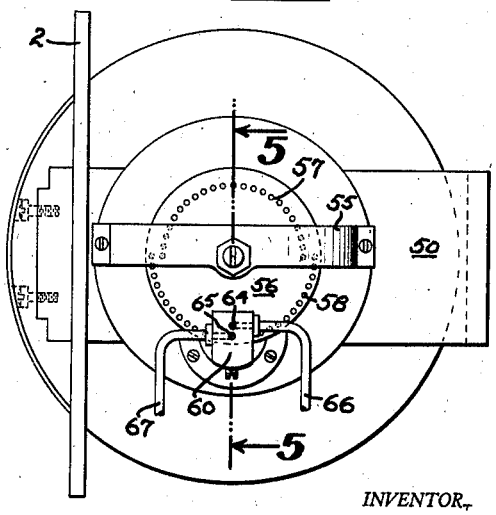
Figure 4 is a top plan view of the compass illustrated in Figures 1 and 2.

Valve disc 56 is provided with two semi-circular sets of apertures each set at a different radial distance from the center of the disc, a near set 57 and a far set 58 (see Figure 4); and a valve assembly comprising a lower air chamber block 59 and an upper air port block 60 is fastened to valve plate 54 in such a manner that valve disc 56 will pass between upper and lower blocks 60 and 59 without touching either one (see Figure 5). The lower block 59 is provided with an air chamber 61 having an opening 62 toward the disc of a sufficient extent as to uncover a circular area equal to the radial extent of both sets of apertures 57 and 58; whereas the upper block is provided with an inner air port 64 and an outer air port 65, each of these ports being positioned to uncover a circular area of only one set of apertures, and opposed thereto. Inner chamber 61 may open to the atmosphere, whereas ports 64 and 65 are preferably connected to air suction pipes 66 and 67 respectively.

Figure 2:
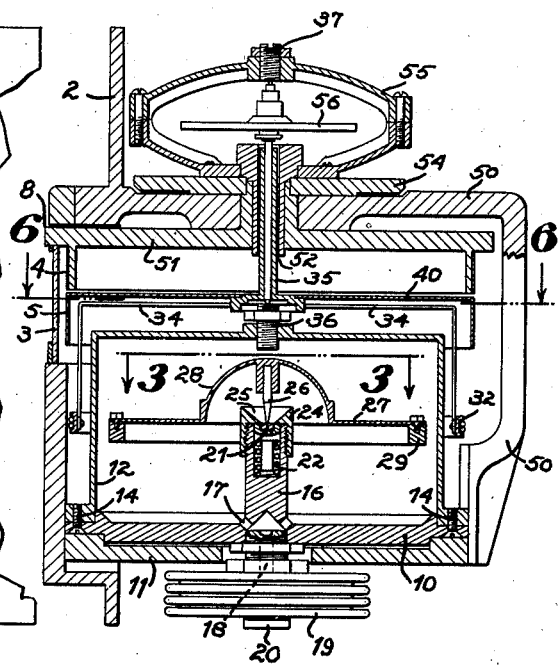
Figure 2 is a longitudinal sectional view, taken as indicated by the line 2—2 in Figure 1.

Assuming that the compass magnets 29 have been magnetized, and that the follower wires 44 have also been magnetized, and that the compass assembly as a whole has been set so that the longitudinal axis of the compass, as determined by mark 7, has been set in north and south line, I find that the compass assembly will take the position as shown in Figure 2. In other words, the axis of the driven ring 32 will be north and south, and the ends 30 of magnets 29 will be north and opposite ends 31 south, thus placing ends 30 and 31 in the same line as the axis of driven member 32. It will of course be understood in this respect that the north pole of the driven member 32 will be pointing toward the south, but this does not affect the action of the compass as a whole because the magnetism of wires 44 is much less than the total magnetism of compass magnets 29. Under the circumstances as outlined, the magnet assembly, as carried by disc 27, will dip very little due to the fact that the follower magnet 32 cannot dip, being prevented therefrom by spider 34; and if magnet assembly 27 should tend to oscillate to or from the earth's surface in the north and south line, such oscillation is quickly damped out because the follower ring cannot follow such oscillation. If, however, the magnet disc 27 should oscillate up and down along the east and west axis, the follower ring is perfectly free to follow, but this oscillation will not disturb the north and south cooperation of the magnets and the follower ring, and directional indication will not change. Furthermore, any such oscillation is quickly damped out due to the presence of the damping fluid operating against disc 27. Thus, I allow oscillation of the driven member around the north and south axis, but do not allow oscillation thereof around the east and west axis. Oscillations along any other axes intermediate these two points are damped out more and more firmly as the intermediate axes approach the north and south line.

As far as oscillations in direction are concerned, the compass magnet assembly, being in the nature of a balanced fly wheel, has no unbalanced mass to be acted upon by a turning moment of the craft, and therefore tends to move only as the magnetic lines of the earth change their angle relative to the craft. It is therefore very difficult to spin magnet assembly 27 by a movement of the craft itself; and as in my prior compass, any divergence of the poles of the magnet and the driven member starts opposing oscillations during recovery, the opposition tending quickly to damp out the oscillations and to return both magnetic members to a correct reading.

With reference to the operation of the valve assembly by the driven member, it will be seen that, if a motor control be operated by the presence or lack of air in air pipes 66 and 67, when both inner and outer sets of apertures 57 and 58 are so aligned with ports 64 and 65, air will enter both of them, then opposing rudder motors can be controlled so that no motion thereof will take place, the action of one being completely balanced by the action of the other. Any turning of the valve disc from this point to the extent that access of air to one port is hindered but allowed to the other, will cause a differential pressure in the two pipes 66 and 67, thus allowing, if desired, energization of one of the opposed motors alone, thereby applying power to move the rudder in the proper direction.

Under these circumstances it is possible, and indeed it is the preferred use of my compass, to control the course upon which a craft is to travel by changing the position of the valve assembly with relation to the diameter intersecting both sets of valve apertures. Thus, by turning course disc 51 by means of manual power applied to knurled disc 8, the course desired with respect to mark 7 on the compass body may be set. If in this set course only one set of valve apertures 57 or 58 is presented to the ports 64 and 65, a turning moment will be given to the craft until both ports are uncovered, whereupon the rudder motors become balanced, thus stabilizing the craft on the course as set. In the meantime, the compass magnetic assembly has maintained its north and south orientation with respect to the craft, and the compass card will coincide with the course card, the course itself being read on cards 4 and 5 by the relation thereto of mark 7.

It is of course obvious that the course can become stabilized at two points 180° apart, but as this will immediately be apparent from a discrepancy in reading between course card 4 and compass card 5, this may be ignored although there are other means, not a part of the present specification, for preventing such an occurrence.

While I have described my device having particular application to aircraft, it is to be distinctly understood that it is applicable to any kind of a craft which is steered in any well known manner, and that the particular valve means which I have described as being applicable to direct-connected motors may be changed without departing from the novel features as claimed, of the compass itself.

Furthermore, it is obvious that the compass arrangement alone, as an improved indicator of direction, may be used for that purpose without the addition of a control valve; and I do not wish to be bound by any particular use of this compass or by its use in any particular form of craft control apparatus, as it will be obvious to anyone skilled in the art that various power control and relay devices may be operated by the turning of axle 35.

I claim:

1. A magnetic compass comprising a disc mounted on a single central pivot, a circular permanent magnet mounted on the edge of said disc substantially in the plane of the point of said pivot, said disc being statically and magnetically balanced before magnetization, a fluid-containing casing surrounding said disc, means for supporting said pivot extending into said casing, a follower magnet in circular form outside of and surrounding said casing and positioned concentrically with and substantially in the plane of said permanent magnet, a vertical follower axle pivotally supporting said follower magnet for movement about an axis substantially coincident with the axis of the compass disc, means for pivotally supporting said follower magnet on said follower axle to allow rotation of said follower magnet around its north and south axis as determined by the magnetization thereof, and a compass card attached to said follower axle.

2. A magnetic compass comprising a disc mounted on a single central pivot, a circular permanent magnet mounted on the edge of said disc substantially in the plane of the point of said pivot, said disc being statically and magnetically balanced before magnetization, a fluid-containing casing surrounding said disc, means for supporting said pivot extending into said casing, a follower magnet in circular form outside of and surrounding said casing and positioned concentrically with and substantially in the plane of said permanent magnet, a vertical follower axle pivotally supporting said follower magnet for movement about an axis substantially coincident with the axis of the compass disc, means for pivotally supporting said follower magnet on said follower axle to allow rotation of said follower magnet around its north and south axis as determined by the magnetization thereof, a compass card attached to said follower axle, a valve rotated by said axle, and valve ports positioned to be acted upon by said rotation without contact with said valve.

3. A magnetic compass comprising a disc mounted on a single central pivot, a circular permanent magnet mounted on the edge of said disc substantially in the plane of the point of said pivot, said disc being statically and magnetically balanced before magnetization, a fluid-containing casing surrounding said disc, means for supporting said pivot extending into said casing, a follower magnet in circular form outside of and surrounding said casing and positioned concentrically with and substantially in the plane of said permanent magnet, a vertical follower axle pivotally supporting said follower magnet for movement about an axis substantially coincident with the axis of the compass disc, means for pivotally supporting said follower magnet on said follower axle to allow rotation of said follower magnet around its north and south axis as determined by the magnetization thereof, a compass card attached to said follower axle, a valve rotated by said axle, valve ports positioned to be acted upon by said rotation without contact with said valve, and means for changing the relative position of said ports relative to the compass assembly as a whole within the rotational path of said valve.

4. A compass comprising a freely tiltable, centrally pivoted, circular compass magnet, and a similar follower magnet of greater diameter pivoted concentric of said compass magnet.

5. A compass comprising a freely tiltable, centrally pivoted, circular compass magnet, and a similar follower magnet of greater diameter pivoted concentric of said compass magnet free to tilt around a single diameter alone.

6. A compass comprising a freely tiltable, centrally pivoted, circular compass magnet, and a similar follower magnet of greater diameter pivoted concentric of said compass magnet free to tilt only around its north and south axis as determined by its poles.

7. A compass comprising a freely tiltable, centrally pivoted, circular compass magnet, and a similar follower magnet of greater diameter pivoted concentric of said compass magnet and of lesser magnetism.

GEORGE DE BEESON.